(12) United States Patent
Betouin et al.

(10) Patent No.: US 9,639,673 B2
(45) Date of Patent: May 2, 2017

(54) PROTECTING SOFTWARE THROUGH A FAKE CRYPTOGRAPHIC LAYER

(71) Applicant: Apple Inc., Cupertino, CA (US)

(72) Inventors: Pierre Betouin, Paris (FR); Augustin J. Farrugia, Los Altos Hills, CA (US); Benoit Chevallier-Mames, Paris (FR); Bruno Kindarji, Paris (FR); Cédric Tessier, Paris (FR); Jean-Baptiste Aviat, Saint Ouen (FR); Mathieu Ciet, Paris (FR); Thomas Icart, Paris (FR)

(73) Assignee: Apple Inc., Cupertino, CA (US)

( * ) Notice: Subject to any disclaimer, the term of this patent is extended or adjusted under 35 U.S.C. 154(b) by 77 days.

(21) Appl. No.: 14/306,713

(22) Filed: Jun. 17, 2014

(65) Prior Publication Data
US 2015/0363580 A1 Dec. 17, 2015

(51) Int. Cl.
*G06F 21/14* (2013.01)
(52) U.S. Cl.
CPC ...... *G06F 21/14* (2013.01); *G06F 2221/0748* (2013.01)
(58) Field of Classification Search
CPC ..... G06F 21/14; G06F 8/41; G06F 2221/0748
See application file for complete search history.

(56) References Cited

U.S. PATENT DOCUMENTS

| | | | |
|---|---|---|---|
| 7,620,987 B2 | 11/2009 | Shelest et al. | |
| 7,891,008 B2 | 2/2011 | Fortune et al. | |
| 2005/0071664 A1* | 3/2005 | de Jong | G06F 21/14 726/26 |
| 2005/0210275 A1* | 9/2005 | Homing | G06F 21/14 713/190 |
| 2007/0039048 A1* | 2/2007 | Shelest | G06F 21/566 726/22 |
| 2011/0035601 A1 | 2/2011 | Davidson et al. | |
| 2013/0014267 A1 | 1/2013 | Farrugia et al. | |
| 2013/0232323 A1 | 9/2013 | Lerouge et al. | |

* cited by examiner

*Primary Examiner* — Amir Mehrmanesh
(74) *Attorney, Agent, or Firm* — Blakely, Sokoloff, Taylor & Zafman LLP (57) ABSTRACT

The fake cryptographic layer obfuscation technique can be used to lure an attacker into expending reverse engineering efforts on sections of code the attacker would normally ignore. To do this the obfuscation technique can identify sections of code that are likely to be of lesser interest to the attacker and disguise them as higher value sections. This can be achieved by transforming a lower value section of code to include code patterns, constants, or other characteristics known to exist in sections of code of higher value, such as cryptographic routines. To transform a code section, the obfuscation technique can use one or more program modifications including control flow modifications, constant value adjustments to simulate well-known cryptographic scalars, buffer extensions, fake characteristic table insertion, debug-like information insertion, derivation function-code generation linking, and/or cryptographic algorithm specific instruction insertion.

20 Claims, 5 Drawing Sheets

PROTECTING SOFTWARE THROUGH A FAKE CRYPTOGRAPHIC LAYER

TECHNICAL FIELD

The present technology pertains to software protection, and more specifically pertains to obfuscating sections of a computer program to resemble higher value code in order to attract reverse engineering efforts.

BACKGROUND

Software developers invest considerable resources in the development and maintenance of computer software. This investment often results in the development of proprietary algorithms that are advantageous over those used by the competition and which the developer would like to keep secret so as to leverage the superiority of the algorithm. In addition to proprietary algorithms, software may also contain embedded secrets such as cryptographic keys. Because of the plethora of important information, software is often the target of various reverse engineering efforts to dissect, analyze, and discover how it works.

To minimize reverse engineering efforts, attackers often attempt to locate higher value code by identifying known code patterns or characteristics. For example, an implementation of AES-128 can include a nested loop where the outer loop is executed 10 times and the inner loop is executed 16 times. An attacker can use these characteristics to identify a section of code that implements AES-128 and then focus reverse engineering efforts on that section of code, while ignoring other code sections of lower value to the attacker. To increase the reverse engineering effort, software developers have applied various protection mechanisms that attempt to hide or disguise high value code. For example, a software developer may apply one or more code obfuscation techniques to a cryptographic routine to disguise known code patterns. Such techniques can be successful at increasing the effort required to reverse engineer a section of code, but they can also have negative side effects, such as decreasing performance. Additionally, they may not be applied uniformly across the program so an attacker may still be able to classify sections of code as lower and higher value even if the class of higher value code is larger than it would have been without the obfuscation.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for obfuscating a computer program to increase the effort required to reverse engineer the program. The disclosed fake cryptographic layer (FCL) obfuscation technique can be used to lure an attacker into expending reverse engineering efforts on sections of code the attacker would normally ignore. To do this the FCL obfuscation technique can identify lower value sections of code. That is, the FCL obfuscation can identify sections of code that are likely to be of lesser interest or of lower value to an attacker. The FCL obfuscation can identify a lower value section of code in a number of ways, include through an annotation, a command line option, and/or an annotation file identifying one or more functions or offsets in the program code. In some cases, the lower value code section can include a derivation function.

After identifying one or more lower value sections of code, the FCL obfuscation can apply one or more modifications to produce a semantically equivalent section of code that has characteristics similar to higher value code, such as a cryptographic routine. For example, a section of code that implements a derivation function, which has no intrinsic added value other than processing an input to produce a deterministic output, can be transformed to include code patterns, constants, and/or characteristics that resemble a known cryptographic routine. By introducing these known code patterns, constants, and/or characteristics, an attacker can be lured into focusing reverse engineering efforts on code sections that are actually of lesser value, thereby increasing the overall effort required to reverse engineer the computer program.

The FCL obfuscation technique can apply one or more discrete obfuscations designed to make a lower value section of a program include code patterns, constants, and/or characteristics of higher value code. In some cases, the higher value code can be code that exists in another section of the program. However, in other cases, the higher value code can be algorithms or implementations of algorithms of well-known functionality such as cryptographic routines that do not already exist in the program. The one or more discrete obfuscations can include control flow modifications (e.g., loop extension), constant value adjustments to simulate well known cryptographic scalars (e.g., constant masking or updating values in neutral operations), buffer extensions, fake characteristic table insertion, debug-like information insertion, derivation function code generation linking, and/or cryptographic algorithm specific instruction insertion.

The FCL obfuscation can be applied to multiple code sections in a program. In some cases, the discrete obfuscations applied to one lower value code section can be different than the discrete obfuscations applied to another lower value code section. For example, the FCL obfuscation can apply obfuscation A and obfuscation B to code section one and obfuscation C to code section two. The number and type of obfuscations applied to a lower value section can be determined in a number of ways. For example, the determination can be based on an annotation, one or more obfuscation levels, a command line argument, etc.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a technique to protect a program against reverse engineering. The disclosed fake cryptographic layer (FCL) obfuscation technique addresses this need by luring an attacker into expending reverse engineering efforts on sections of code the attacker would normally ignore. To do this the FCL obfuscation technique identifies sections of code that are likely to be of lesser interest or of lower value to an attacker and disguises them as higher value sections. This can be achieved by transforming a lower value section of code to include code patterns known to exist in sections of code of higher value. For example, a section of code that implements a derivation function, which has no intrinsic added value other than processing an input to produce a deterministic output, can be transformed to include code patterns that resemble a known cryptographic routine. By introducing these known code patterns, an attacker can be lured into focusing reverse engineering efforts on code sections that are actually of lesser value, thereby increasing the overall effort required to reverse engineer the computer program.

The FCL obfuscation technique can apply one or more discrete obfuscations designed to make a section of a program that does not include cryptographic functionality appear to include code patterns from cryptographic routines, thereby giving the appearance that the section performs cryptographic routines. The one or more discrete obfuscations can include control flow modifications, constant value adjustments to simulate well known cryptographic scalars, buffer extensions, fake characteristic table insertion, debug-like information insertion, derivation function code generation linking, and/or cryptographic algorithm specific instruction insertion. Each of the discrete obfuscations is discussed in more detail below.

In addition to the FCL obfuscation, other obfuscations can be applied to the computer program. For example, an obfuscation can be applied across the computer program prior to the FCL obfuscation, e.g., the FCL obfuscation is applied to an already obfuscated section of the program. Alternatively, an obfuscation can be applied after the FCL obfuscation, e.g., an obfuscation designed to complicate cryptographic routines can be applied on top of an FCL obfuscated section of the program. In yet another example, an obfuscation can be applied to a separate section of the program, e.g., the FCL obfuscation can be applied to section one and a second obfuscation can be applied to section two.

Figure 1:
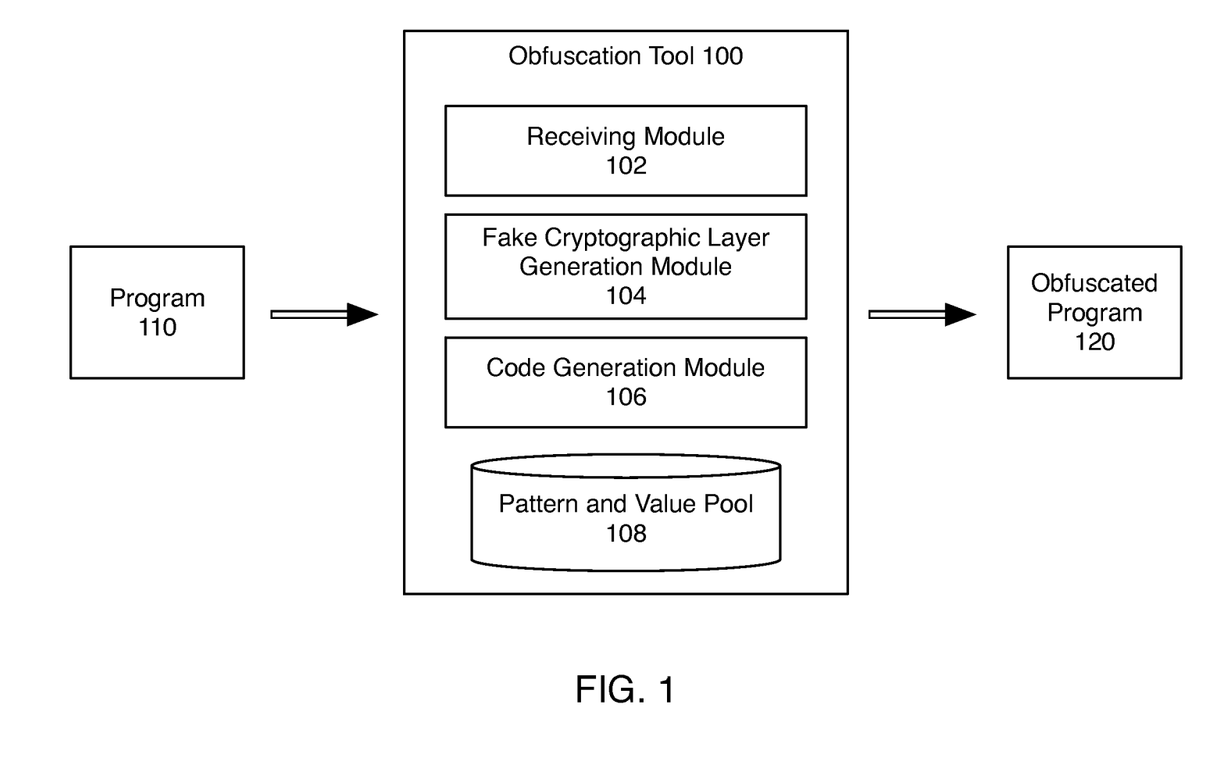
FIG. 1 illustrates an exemplary obfuscation tool.

The FCL obfuscation can be applied using an obfuscation tool that receives a computer program and outputs an obfuscated, but semantically equivalent computer program. FIG. 1 illustrates an exemplary obfuscation tool 100, such as a compiler or post-processing tool running on a processor within a computing device. Obfuscation tool 100 can be configured to disguise one or more sections in a computer program as code implementing cryptographic functionality or other high value code. A computer program can include human-readable source code, compiled machine-executable object code, virtual machine code, bytecode and/or any other intermediate representation of source code or compiled code.

Obfuscation tool 100 takes as input program 110, which can be source code, executable code, virtual machine code, bytecode, or an intermediate representation, depending on the configuration of obfuscation tool 100. For example, obfuscation tool 100 can be a compiler that takes source code as input and produces an obfuscated executable program. In another example, obfuscation tool 100 can be a binary rewriting tool that takes an executable program and produces an obfuscated executable program. In still another example, obfuscation tool 100 can be a source code obfuscator that takes source code as input and produces obfuscated source code.

Obfuscation tool 100 can include one or more modules for analyzing input program 110; inserting, modifying, and/or removing instructions; and generating an obfuscated program 120, e.g., receiving module 102, fake cryptographic layer generation module 104, and code generation module 106. Additionally, obfuscation tool 100 can include a pool 108 of patterns and/or values specific to known cryptographic routines. Each of the modules in FIG. 1 is discussed in more detail below; however, it should be understood by one skilled in the art, that the architectural configuration illustrated in FIG. 1 is simply one possible configuration and that other configurations with more or less components is also possible.

Obfuscation tool 100 can include receiving module 102. Receiving module 102 can be configured to receive input program 110. In some configurations, receiving module 102 can convert input program 110 to an alternate representation. For example, if input program 110 is source code, receiving module 102 can convert the source code to an intermediate representation, which can be analyzed and transformed using the FCL obfuscation.

Obfuscation tool 100 can include fake cryptographic layer generation module 104. Fake cryptographic layer generation module 104 can be configured to identify sections of the program of lower value, which can be transformed using the FCL obfuscation technique to appear as higher value code. That is, fake cryptographic layer generation module 104 can identify sections of code that are likely to be of lesser interest or of lower value to an attacker, or include functionality that is of minor, peripheral, nonessential, or non-critical. In some cases, a lower value section of the program can be designated via an annotation, such as an annotation attached to a function or surrounding a set of instructions. For example, a non-annotated function declaration can be int multiply (int x, int y). The same example annotated function declaration can be int_attribute_((annotation_title)) multiply (int x, int y). The annotations can embody or include metadata describing additional obfuscation information, such as an obfuscation strength level. Lower value sections of code can also be specified in a separate location from the program code, such as in a separate annotation file identifying one or more functions or offsets in the program code. A lower value section of code can also be designated via other mechanisms, such as a command line option that specifies function names or offsets.

Fake cryptographic layer generation module 104 can also be configured to apply one or more discrete FCL obfuscations to one or more of the identified lower value sections of code, such as a function, a set of instructions, or data, to generate a section of code that has characteristics or the appearance of higher value code. The one or more discrete FCL obfuscations can include control flow modifications, constant value adjustments to simulate well known cryptographic scalars, buffer extensions, fake characteristic table insertion, debug-like information insertion, derivation function-code generation linking, and/or cryptographic algorithm specific instruction insertion.

In some cases, when fake cryptographic layer generation module 104 applies a discrete obfuscation to a lower value section of code, fake cryptographic layer generation module 104 can generate a second section of code. In this case, the fake cryptographic layer generation module 104 can replace the identified lower value section of code with the second section of code. In other cases, when fake cryptographic layer generation module 104 applies a discrete obfuscation to a lower value section of code, fake cryptographic layer generation module 104 can insert, modify, and/or delete instructions and/or data from the lower value section of code to create the appearance or characteristics of a higher value section of code without the additional step of creating a second set of instructions and replacing the first. In either case, the resulting section of code, which has the appearance or characteristics of higher value code, will be semantically equivalent to the original section of code.

Obfuscation tool 100 can include code generation module 106. Code generation module 106 can generate obfuscated program 120. The format of obfuscated program 120 can vary with the configuration of obfuscation tool 100. For example, obfuscated program 120 can be source code, an intermediate representation, machine code, object code, virtual machine code, or some other code executable by a computing device.

Obfuscation tool 100 can also include pattern and value pool 108. Pool 108 can be pre-populated with well-known code patterns and data. For example, Pool 108 can include constants, e.g., constants used in SHA-256, MD5, SHA3, etc.; debug strings; debug code; algorithm specific instruction sequences; tables, e.g. AES S-Box or T-Table; external function symbols; loop patterns; etc.

As described above, the FCL obfuscation technique can include one or more discrete obfuscations. A discrete FCL obfuscation can be a control flow modification, such as a loop extension. A loop extension obfuscation can transform a loop of size n iterations to a loop of m iterations, where m>n. In the case of the FCL obfuscation, the value m can be selected to mimic the number of iterations in a loop in a well known cryptographic routine. For example, an AES key schedule requires ten iterations to complete.

To illustrate a loop extension obfuscation consider the following original code:

```
for (i = 0; i < 128; i++) {
    buf[i] = i ^ 0x1234;
}
```

By applying the loop extension obfuscation, the obfuscated code can have characteristics of a loop in AES-128:

```
for (i = 0; i < 10; i++) {
    for (j = 0; j < 16; j++) {
        k = i * 10 + j;
        buf[k] = k ^ 0x1234;
    }
}
```

After the loop extension obfuscation is applied, the loop in the obfuscated section of code executes more times than in the original section of code. Accordingly, other aspects of the code may require adjustment. For example, in the original loop above, the first 128 slots in the buffer are assigned a value. However, in the obfuscated code, the first 160 slots of the buffer are assigned a value. To preserve the semantics of the original application, the size of the buffer must also be transformed during the loop extension obfuscation. In some cases, this transformation can occur by coupling the loop extension with another discrete FCL obfuscation, such as the buffer extension obfuscation.

The loop extension obfuscation can be used to transform a lower value section of code into a section of code with characteristics of any size AES algorithm (e.g., 128, 192, 256), a hash algorithm, a public key computation, a key scheduling algorithm, etc. For example, AES-128 has a loop size of 10, AES-192 has a loop size of 12, AES-256 has a loop size of 14, MD5 has a loop size of 64, and SHA-256 has a loop size of 64. By transforming existing loops to have a size of a loop in a well-known cryptographic algorithm, an attacker can be led to believe the code is a higher value section of code.

Figure 2:
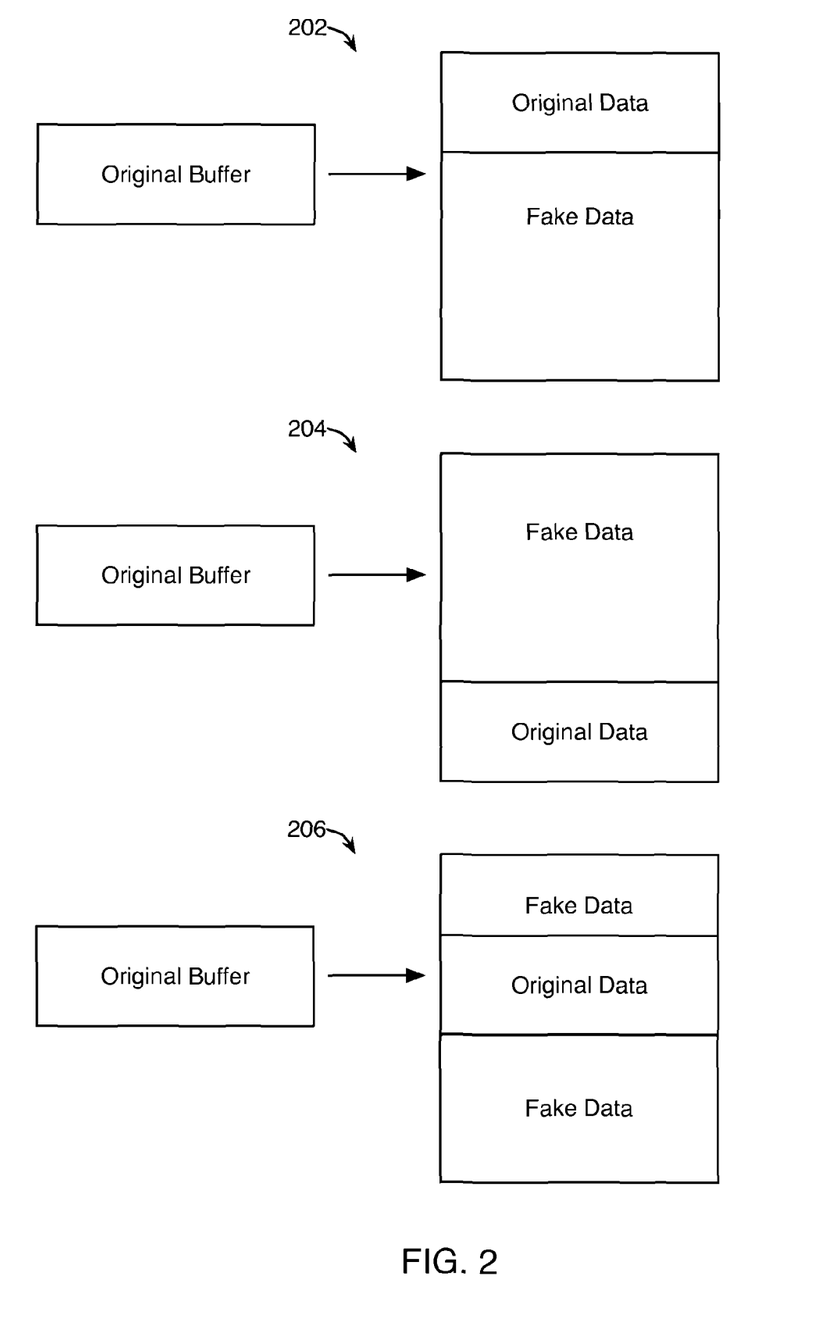
FIG. 2 illustrates exemplary buffer extension scenarios after applying a buffer expansion obfuscation technique.

The buffer extension obfuscation can be used to increase the size of a buffer by embedding the original buffer in a larger buffer. How the original buffer is arranged within the extended buffer can vary. For example, FIG. 2 illustrates a few configurations. In configuration 202, the buffer is extended such that the original buffer occupies the beginning of the extended buffer and the remainder of the extended buffer is filled with fake data. In configuration 204, the buffer is extended such that the original buffer occupies the end of the extended buffer and the extended buffer is padded with fake data up to the original data. In configuration 206, the buffer is extended such that the original buffer is inserted in the middle of the extended buffer and the extended buffer is filled with fake data before and after the original data. To improve the appearance of higher value code, the buffer extension obfuscation can insert instructions that access the portions of the extended buffer that correspond to the fake data.

Another discrete FCL obfuscation can be constant value adjustments to simulate well-known cryptographic scalars. Constant value adjustments can occur in a variety of ways including updating values using neutral operations and constant value masking. Updating values using neutral operations modifies a value using a neutral operation and a neutral constant. In this obfuscation, a neutral operation can be any invertible operation, such as addition, multiplication, exclusive or, rotation, etc. A neutral constant can be a random constant or a constant selected to have specific characteristics, such as a constant typically found in a cryptographic routine. For example, SHA-256 uses the follow values for initialization:

0x6a09e667
0xbb67ae85
0x3c6ef372
0xa54ff53a
0x510e527f
0x9b05688c
0x1f83d9ab
0x5be0cd19

By using one or more of these values, a lower value section of code can be made to have characteristics of SHA-256. Other hashes, such as MD5 and SHA3 use well-known constants that attackers may use to identify higher value code.

To illustrate the updating values using neutral operations obfuscation consider the following original code:

a=buf[42];
// some other code
a+=f( );

By applying the updating values using neutral operations obfuscation, the obfuscated code can be:
a=buf[42];
a+=NEUTRAL_VALUE;
// some other code
a+=f( );
a-=NEUTRAL_VALUE;

In this example, NEUTRAL_VALUE is a previously defined constant value.

Constant value masking can be used to prevent a value from appearing in memory or in a register. The obfuscation can be performed by applying a mask value to a constant value using an invertible operation. For example, the following are examples of constant value masking:
xor transform: xor r0, 0x12341234
additive transform: add r0, 0xf0f0f0f0
affine transform: add r0, 0x7, mul r0, 0x7f As with the updating values using neutral operations obfuscation, the constant value masking obfuscation can use operations and values typically found in a cryptographic routine.

The constant value masking obfuscation can also be used to transform scalars so that they appear to be pointers, where a pointer is a numerical value that references the address of some data in memory. Because data is stored in specific sections of memory based on the type of data, e.g., user allocated memory, operating system allocated memory for storing software machine code, thread stack memory, etc., the memory sections have addresses that are easily identifiable to attackers. By disguising scalars as pointers to particular memory sections, a lower value section of code can have characteristics of higher value code and attract attacker attention. For example, the following are examples of constant value masking to transform scalars to appear as if they are pointers:

| unmasked scalar value | masked scalar value (fake pointer) | mask value |
| --- | --- | --- |
| 1 | 0xbff1dab0 | 0xbff1dab1 |
| 0x12345678 | 0xbff1df28 | 0xadc58950 |
| 0xf0f0f0f0 | 0xbff1e00 | 0xfb0feef0 |

Additionally, value masking can be applied to pointers to make the pointers appear as if they are scalar values.

Figure 3:
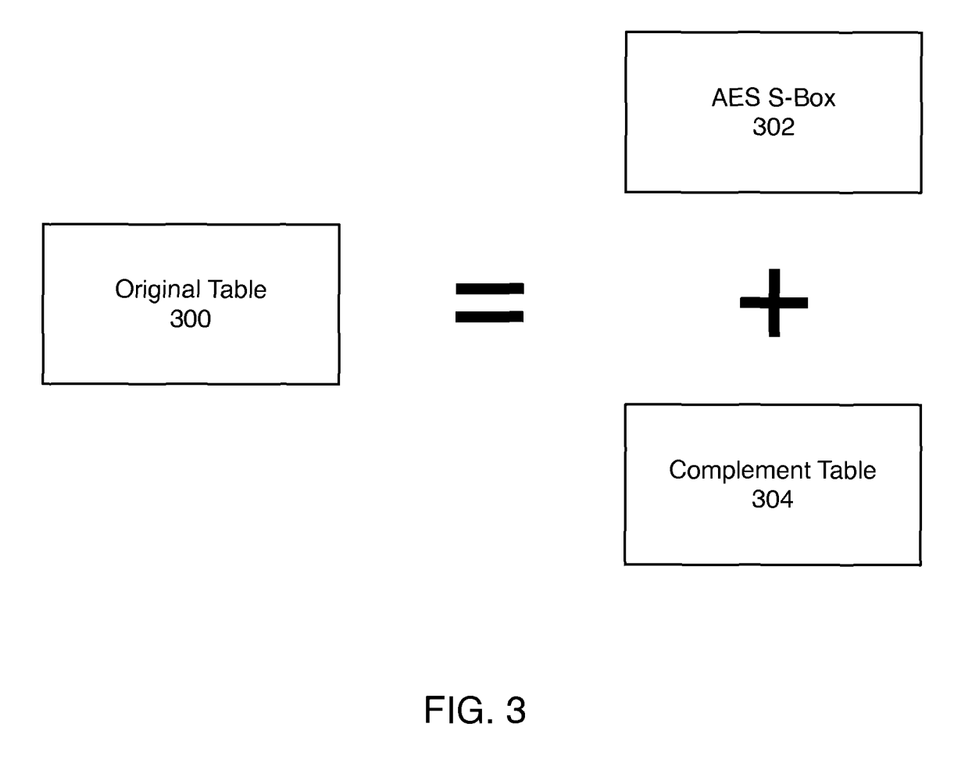
FIG. 3 illustrates an exemplary table obfuscated using a fake table obfuscation technique.

Another discrete FCL obfuscation can be inserting fake characteristic tables. In this obfuscation a table in the program, such as a table of data used in a lower value section of the program, can be replaced with two or more tables. When the two or more tables are combined using a specific operation they produce the original table. At least one of the tables can be a table typically found in higher value code, such as an AES S-Box, an AES T-Table, an AES Rcon, or another similar table found in a cryptographic routine, such as AES established by the U.S. National Institute of Standards and Technology (NIST). Then to be able to produce the original table, at least one of the tables can be a complement table. For example, FIG. 3 illustrates replacing original table 300 in a program with two tables: AES S-Box 302 and complement table 304. During runtime, values from AES S-Box 302 can be combined with values from complement table 304 to produce values in original table 300, thus ensuring proper execution of the program. Additionally, pointers to the new tables can be inserted in the program to increase the number of references in the program further bolstering the appearance that the tables are of higher value.

In cases where the original table was used in a loop that is obfuscated using the loop extension obfuscation, a new table can be selected to match the characteristics of the loop. For example, if the loop is extended to imitate an AES key schedule routine, at least one of the new tables can be an AES Rcon.

Another discrete FCL obfuscation can be inserting debug-like information. Debug information is very useful for attackers who use the information to gain insight into a program and areas to focus reverse engineering efforts. An attacker's efforts can be diverted to lower value code through fake strings and fake debug code. For example, a common debug string found in cryptographic related code is the string, "AES-128-CBC." The presence of such a string can lead an attacker to believe that there are cryptographic routines in the program. Additionally, if the string is referenced in the program then the attacker may reason that the code section referencing the string is cryptographic related code, and thus focus reverse engineering efforts on that code section.

To preserve the semantics of the program, the fake strings can be referenced in conditional code that is designed to never actually execute. For example, the obfuscation can insert fake debug code that references the fake string cryptoAlgVersion="AES-128-CBC," such as:
if (gDebugCryptoLevel>10)
print cryptoAlgVersion;

Another discrete FCL obfuscation can be linking code generation to a derivation function. Digital rights management software often includes derivation functions, for example for deriving keys. These functions have little intrinsic added value other than processing an input to produce a deterministic output. Such functions are of little interest to attackers and instead of spending time reverse engineering these functions an attacker may ignore, steal, or simply call into the function to obtain the output. To increase the value of a section of code implementing a derivation function, the derivation function can make use of higher value code in generating an output value. For example, in generating an output value, a derivation function can be based on a single AES round or an MD5 or SHA-256 block computation. By introducing higher value code into the derivation function, the code section is likely to be of more interest to an attacker, and thus the attacker will expend reverse engineering resources trying to understand the code section.

Another discrete FCL obfuscation can be inserting cryptographic algorithm specific instructions. Implementations of common cryptographic algorithms often include well-known instruction sequences. For example, the following sequence of x86 assembly instructions is characteristic of an AES round:
movzx eax, [eax+ebx+ecx]
xor eax, [esi+ecx]

Additionally, modern processors include specific instructions for various cryptographic algorithms such as AES, SHA, and CRC32. These instructions can be inserted in a lower value section of code so that the code section has characteristics of a cryptographic routine, thus attracting an attacker's attention. However, as with the other FCL discrete obfuscations, the instructions must be chosen and inserted so as to preserve the original semantics of the program.

Other discrete obfuscations can be applied to a lower value section of code to create the appearance or characteristics of a higher value section of code, such as inserting constants or external function symbols. For example, when a message is signed or ciphered, it can be padded to fix the algorithm's block size. These algorithms use well-known and recognizable padding schemes. For example, PKCS7 uses the scheme:
<message> n*remaining_bytes
If the number of bytes required to satisfy the block size is 3, then the message will be padded as:
<message> 0x3 0x3 0x3
These padding schemes can be used to introduce constants that create the appearance or characteristics of a higher value section of code. Other constants can be based on recognizable fields in certificates, such as an ASN1 structure, ASCII strings, and the binary blob of the public key in X509 certificates. Additionally, external library symbols related to cryptographic algorithms, such as AES encryption and decryption functions, can be inserted in the program even if the external libraries are never used.

Figure 4:
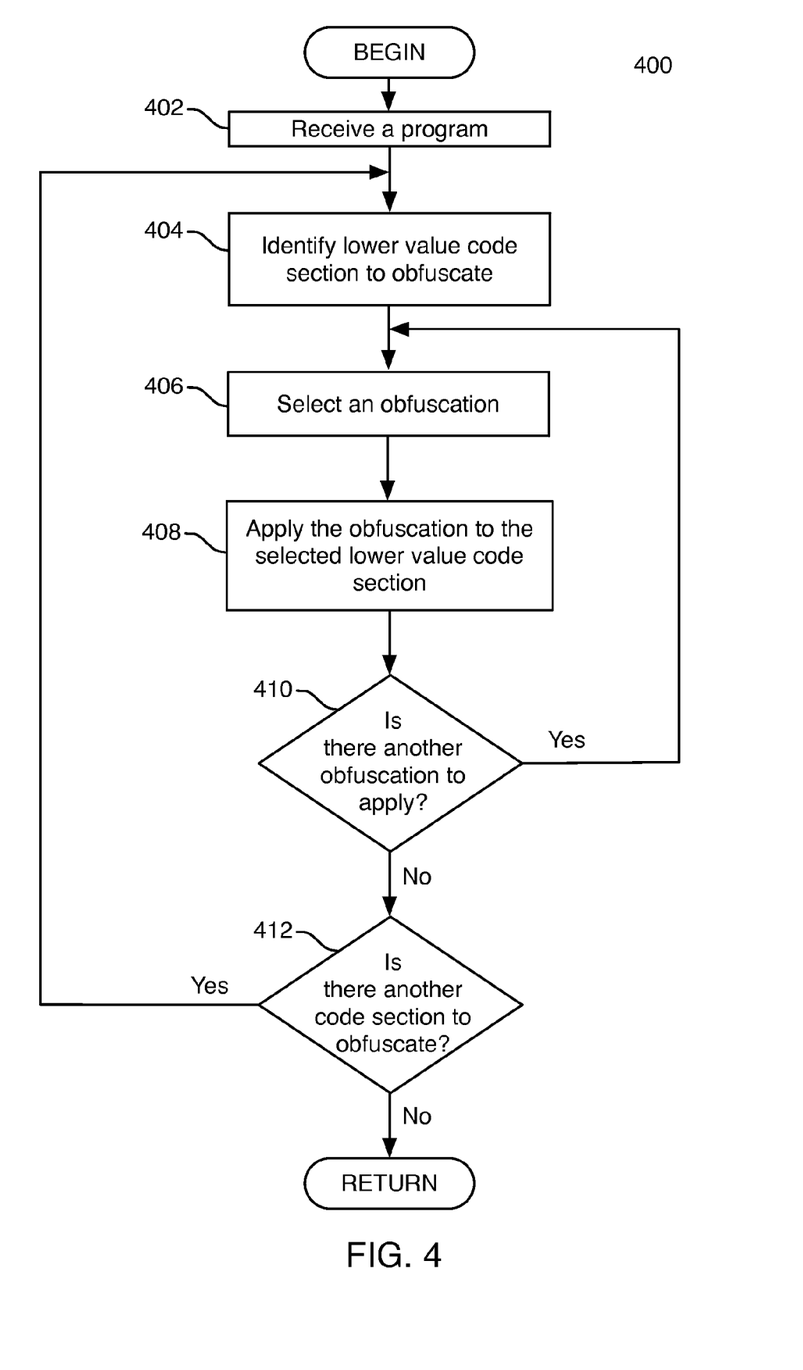
FIG. 4 illustrates an exemplary method embodiment for obfuscating a program using the fake cryptographic layer obfuscation technique.

FIG. 4 is a flowchart illustrating exemplary method embodiment 400 for obfuscating a program using the FCL obfuscation technique. For the sake of clarity, this method is discussed in terms of an exemplary obfuscation tool, such as is shown in FIG. 1. Although specific steps are shown in FIG. 4, in other embodiments a method can have more or less steps than shown.

At some point, obfuscation tool 100 can receive a program to be obfuscated using the FCL technique (402). In addition to the program, obfuscation tool 100 can receive one or more obfuscation parameters, such as a list of one or more sections to transform or one or more obfuscation strength levels. The obfuscation strength level can include a performance level, a complexity level, and/or a security level. The obfuscation strength level can be used to determine which identified lower value sections of code to obfuscate, which discrete FCL obfuscations to apply, the number of discrete FCL obfuscations to apply, and/or adjust a discrete FCL obfuscation.

After receiving a program to obfuscate, obfuscation tool 100 can identify a lower value section of code to obfuscate (404). In some cases, a lower value section of code will be designated via an annotation attached to a function or annotations surrounding a sequence of instructions, or via some other technique such as a separate file, command line option, or analyzing the program. As part of identifying a lower value section of code, obfuscation tool 100 can determine whether the section of code should be obfuscated. For example, each lower value section of code can be assigned an obfuscation level. This obfuscation level can be compared with a global obfuscation level and if the global obfuscation level exceeds the assigned obfuscation level, the selected section of code can be identified for obfuscating.

After identifying a lower value section of code, obfuscation tool 100 can select a discrete FCL obfuscation to apply (406). In some cases, obfuscation tool 100 can select the discrete FCL obfuscation based on the annotation. For example, the annotation can include metadata specifying one or more obfuscations. In another example, the annotation can include metadata specifying an obfuscation strength level. In this case, obfuscation tool 100 may be configured such that a particular sets of discrete FCL obfuscations correspond to different obfuscation levels, e.g. the higher the obfuscation level the greater number of discrete obfuscations applied or specific obfuscations apply at different obfuscation levels.

After selecting an obfuscation, obfuscation tool 100 can apply the selected discrete FCL obfuscation to the identified lower value section of code (408) to generate a section of code with the appearance or characteristics of higher value code, such as a particular cryptographic routine.

Obfuscation tool 100 can then check if there are additional discrete FCL obfuscations to apply to the identified section of code (410). In some cases, this determination can be made by checking a list of obfuscations that should be applied to the section of code, such as list of obfuscations specified in the metadata of an annotation or a list corresponding to a specified obfuscation level. However, in some cases, obfuscation tool 100 can continue selecting discrete FCL obfuscations until the identified section of code and/or the program reaches a predefined level, e.g., performance overhead, complexity, and/or security. If there is another obfuscation to apply, obfuscation tool 100 can proceed to identify a next discrete FCL obfuscation (406). If no additional discrete FCL obfuscations should be applied to the identified section of code, obfuscation tool 100 can check if there are additional lower value code sections to obfuscate (412). If there is another lower value section of code to obfuscate, obfuscation tool 100 can proceed to identify the next lower value section of code (404). Otherwise, obfuscation tool 100 can resume previous processing, which can include repeating method 400, applying a different obfuscation technique to the FCL protected program, or outputting a protected program.

Figure 5A:
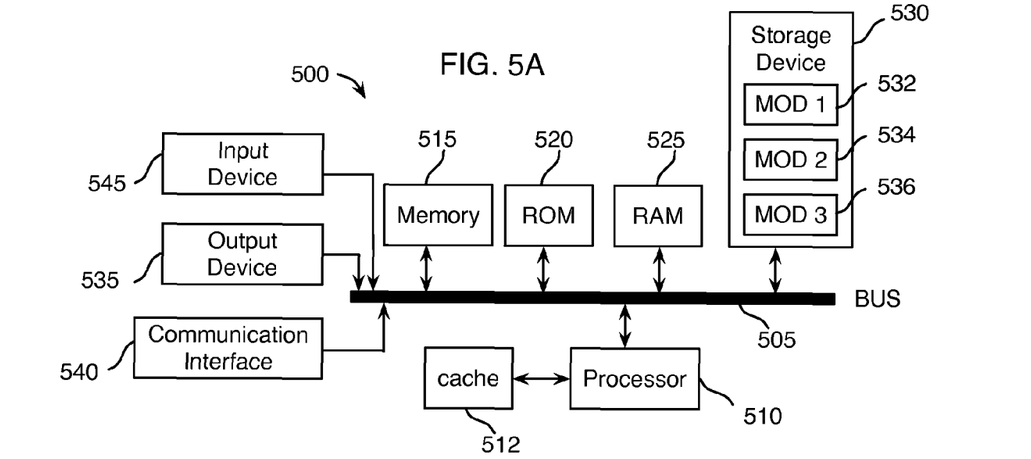
FIGS. 5A and 5B illustrate exemplary system embodiments.
Figure 5B:
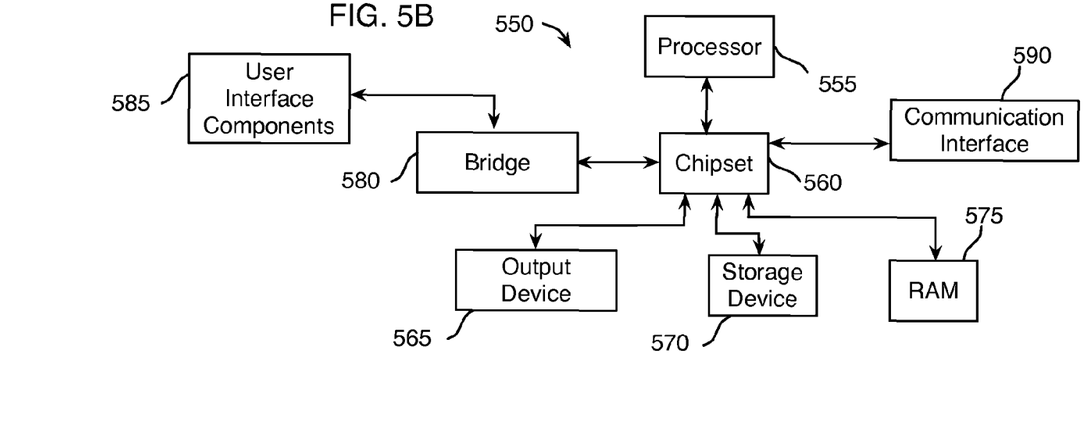

FIG. 5A, and FIG. 5B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer readable medium storing instructions which, when executed by one or more processors, cause the one or more processors to perform operations to compile source code of a computer program, the operations comprising:

identifying a first code section at a location in a computer program, the first code section having a first reverse engineering target value associated with characteristics of source code within the first code section; and applying a modification to the first code section to produce a second code section at the location, the second code section having equivalent functionality as the first code section and a second reverse engineering target value that is higher than the first reverse engineering target value, wherein the first reverse engineering target value and the second reverse engineering target value are indicative of a likelihood of reverse engineering.

2. The non-transitory computer readable medium of claim 1, wherein applying the modification to the first code section to produce the second code section includes replacing the first code section at the location with a second set of instructions.

3. The non-transitory computer readable medium of claim 1, wherein applying the modification includes applying a control flow modification, constant value adjustment, buffer extension, fake characteristic table insertion, debug-like information insertion, derivation function-code generation linking, or cryptographic algorithm specific instruction insertion.

4. The non-transitory computer readable medium of claim 3, wherein the control flow modification is a loop extension.

5. The non-transitory computer readable medium of claim 3, wherein the constant adjustment is at least one of constant masking or updating values using neutral operations, wherein updating values using neutral operations includes using a neutral operation and a neutral constant, wherein the neutral operation is an invertible operation and a neutral constant is a random constant or a constant selected to have characteristics of a constant of a cryptographic routine.

6. The non-transitory computer readable medium of claim 1, wherein the first code section includes a derivation function.

7. The non-transitory computer readable medium of claim 1, the operations additionally comprising:
identifying the first code section based on an annotation designating the first code section, the annotation specifying an obfuscation strength level for the first code section; and
applying the modification to the first code section when a global obfuscation strength level exceeds the obfuscation strength level for the first code section.

8. The non-transitory computer readable medium of claim 1, wherein the second code section includes characteristics of a third code section within the computer program, the third code section including cryptographic code.

9. A system comprising:
a non-transitory computer readable medium storing instructions;
one or more processors connected with the non-transitory computer readable medium to execute the instructions, wherein the instructions cause the one or more processors to provide a set of modules including:
a receiving module configured to control the one or more
processors to receive a computer program including a first code section, the first code section having a first reverse engineering target value associated with characteristics of source code within the first code section;
an obfuscation module configured to control the one or more processors to apply a first obfuscation to the first code section to produce a second code section including obfuscated code, wherein the second code section has equivalent functionality as the first code section and has a second reverse engineering target value that is higher than the first reverse engineering target value, the second reverse engineering target value associated with characteristics of the obfuscated code;
an insertion module configured to control the one or more processors to replace the first code section with the second code section; and
wherein the first reverse engineering target value and the second reverse engineering target value are indicative of a likelihood of reverse engineering.

10. The system of claim 9, wherein the obfuscation module is further configured to control the one or more processors to:
apply a second obfuscation to a second location of the first code section to produce the second code section.

11. The system of claim 9, wherein the first and second obfuscation each include at least one of control flow modification, constant value adjustment, buffer extension, fake characteristic table insertion, debug-like information insertion, derivation function-code generation linking, or cryptographic algorithm specific instruction insertion.

12. The system of claim 9, wherein the first code section is designated by an annotation that specifies an obfuscation strength level, the receiving module is configured to receive a global obfuscation strength level, and the obfuscation module is to apply the first obfuscation to the first code section when the global obfuscation strength level exceeds the obfuscation strength level of the first code section.

13. The system of claim 12, wherein the characteristics of source code within the first code section indicate that the first code section lacks a cryptographic routine and the characteristics of the obfuscated code within the second code section indicate that the second code section includes a cryptographic routine.

14. A compilation system to perform operations to compile source code of a computer program, the compilation system comprising:
one or more processors;
a non-transitory computer readable medium storing instructions that cause the one or more processors to provide a receiving module and an obfuscation module, the receiving module configured to control the one or more processors to receive source code including at least one designated code section and the obfuscation module configured to control the processor to:
select a first designated code section at a first location, the first designated code section having a first reverse engineering target value; and
apply at least one obfuscation to the first designated code section to produce a first obfuscated code section at the first location, the first obfuscated code section being functionally equivalent to the first designated code section and the first obfuscated code section having characteristics of source code having a second reverse engineering target value that is higher than the first reverse engineering target value, wherein the first reverse engineering target value and second reverse engineering target value is indicative of a likelihood of the source code being a target of reverse engineering.

15. The compilation system of claim 14, wherein the obfuscation module is further configured to control the processor to:
select a second designated code section at a second location; and apply at least one obfuscation to the second designated code section to produce a second obfuscated code section at the second location, the second obfuscated code section being functionally equivalent to the second designated code section and the second obfuscated code section having characteristics similar to source code having a high reverse engineering target value.

16. The compilation system of claim 14 further comprising:
a code generation module configured to control the one or more processors to compile the received source code including the obfuscated code section.

17. The compilation system of claim 14, wherein the receiving module is further configured to receive a global obfuscation strength level.

18. The compilation system of claim 17, wherein the first designated code section has an assigned obfuscation strength level, and wherein the first designated code section is selected when the global obfuscation strength level exceeds the assigned obfuscation strength level.

19. The compilation system of claim 17, wherein at least one obfuscation is selected based on the obfuscation strength level.

20. The compilation system of claim 14, wherein the source code having the second reverse engineering target value is cryptographic code.

* * * * *